United States Patent
Elford et al.

(10) Patent No.: US 8,855,293 B2
(45) Date of Patent: *Oct. 7, 2014

(54) FRAME INJECTED DSL VIA FACE FED PROTECTOR MODULE

(75) Inventors: Michael L. Elford, Calhoun, LA (US);
Pete Kawamoto, Centennial, CO (US);
Diana Unser, Lakewood, CO (US);
Warren Novak, Northglenn, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/529,660

(22) Filed: Jun. 21, 2012

(65) Prior Publication Data

US 2013/0343537 A1    Dec. 26, 2013

(51) Int. Cl.
*H04M 3/00* (2006.01)
*H04M 1/24* (2006.01)

(52) U.S. Cl.
USPC ........................................ 379/331; 379/27.05

(58) Field of Classification Search
USPC .............. 379/331, 27.05, 387.01, 412, 93.03, 379/106.04, 166; 361/119; 370/352
See application file for complete search history.

(56) References Cited

U.S. PATENT DOCUMENTS

| | | | |
|---|---|---|---|
| 6,707,903 B2 * | 3/2004 | Burok et al. | 379/265.02 |
| 6,714,643 B1 * | 3/2004 | Gargeya et al. | 379/266.06 |
| 7,072,966 B1 * | 7/2006 | Benjamin et al. | 709/228 |
| 7,268,993 B2 * | 9/2007 | Dement | 361/119 |
| 7,346,532 B2 * | 3/2008 | Kusama et al. | 705/7.15 |
| 7,463,472 B1 * | 12/2008 | Bell | 361/118 |
| 2004/0037021 A1 * | 2/2004 | Heidorn et al. | 361/119 |
| 2004/0228064 A1 * | 11/2004 | Bennett et al. | 361/119 |
| 2007/0070570 A1 * | 3/2007 | Turner et al. | 361/119 |
| 2009/0193050 A1 * | 7/2009 | Olson | 707/102 |
| 2013/0070383 A1 * | 3/2013 | Pepe | 361/119 |

* cited by examiner

*Primary Examiner* — William Deane, Jr.
(74) *Attorney, Agent, or Firm* — Swanson & Bratschun, L.L.C.

(57) ABSTRACT

The disclosed embodiments include a surge protection module that includes an overvoltage protection component and a ground pin configured on a bottom end of the surge protection module. The ground pin is in electrical communication with the overvoltage protection component. The surge protection module also includes a pair of outside plant tip and ring pins configured on the bottom end of the surge protection module. The pair of outside plant tip and ring pins in electrical communication with the overvoltage protection component. The surge protection module is configured to receive a wire wrap pair consisting of a central office tip wire and a central office pin wire. The central office tip wire and the central office pin wire are configured to be in electrical communication with the overvoltage protection component.

20 Claims, 6 Drawing Sheets

FRAME INJECTED DSL VIA FACE FED PROTECTOR MODULE

BACKGROUND OF THE INVENTION

1. Field of the Invention

The present invention relates generally to systems and methods for providing communications, and more particularly to a surge protector module utilized in the telecommunication industry.

2. Discussion of the Related Art

The National Electric Code requires the telephone industry to provide electrical surge protection at the point of entry where copper wires enter a building. The code requires that telephone equipment within the building be protected from three types of electrical hazards: 1) surge protection from lightning and switching surges; 2) over current protection; and 3) circuit lock-out protection for use in the event a disturbance remains on the circuit for an extended period of time.

The required protection is provided by installing a building entrance panel at the point where the outside lines enter the building. The panel includes a surge protection module for each telephone circuit in the building so that each interior telephone circuit is protected from external electrical disturbances.

The disclosed embodiments seek to provide solutions or improvements to one or more shortcomings associated with current surge protection modules.

SUMMARY OF THE INVENTION

The disclosed embodiments include a surge protection module designed to reduce noise that affects digital subscriber line (DSL) service. For example, in one embodiment, a surge protection module includes an overvoltage protection component and a ground pin configured on a bottom end of the surge protection module. The ground pin is in electrical communication with the overvoltage protection component. The surge protection module also includes a pair of outside plant tip and ring pins configured on the bottom end of the surge protection module. The pair of outside plant tip and ring pins are in electrical communication with the overvoltage protection component. The surge protection module is configured to receive a wire wrap pair consisting of a central office tip wire and a central office pin wire. The central office tip wire and the central office pin wire are configured to be in electrical communication with the overvoltage protection component.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The disclosed embodiments and advantages thereof are best understood by referring to FIGS. 1-9 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
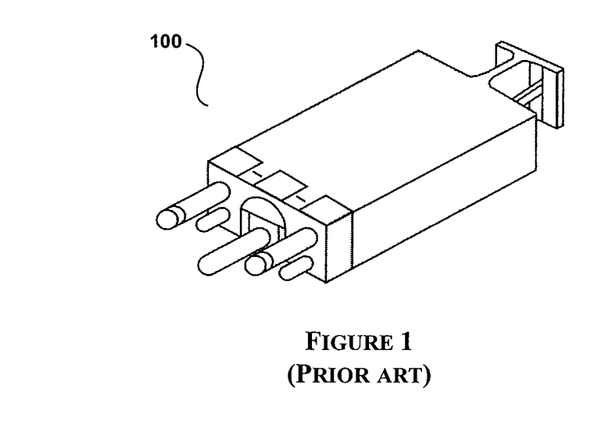
FIG. 1 illustrates an example of a typical surge protection module.

Beginning with FIG. 1, an example of a typical surge protection module 100 is depicted. The surge protection module 100 is designed to provide power fault/overvoltage protection for most standard telephone line applications (i.e., plain old telephone service (POTS)). POTS is the voice-grade telephone service that remains the basic form of residential and small business service connection to the telephone network in many parts of the world.

The surge protection module 100 has an industry-standard 5-pin configuration for use in central and remote office connector blocks as well as building entrance terminals. The surge protection module 100 may be configured using different types of technology for providing surge protection including, but not limited to, as a solid-state overvoltage protector (SSOVP) module and as a gas tube overvoltage protector module. The surge protection module 100 is designed to short to ground (also known as a "fail-safe event") when an electrical surge exceeds the capability of the SSOVP device or gas tube. In some embodiments, the surge protection module 100 may also include a heat coil to protect digital equipment line cards against overheating caused by prolonged currents.

As will be further explained, two of the pins of the surge protection module 100 are in electrical communication with the customer's telephones (typically referred to in the industry as outside plant (O.P.) tip and ring) and another two pins are in electrical communication with devices of a service provider (typically referred to in the industry as a central office (CO) tip and ring). The fifth pin a ground pin. "Tip" and "Ring" are common terms in the telephone service industry referring to the two wires or sides of an ordinary telephone line. Tip is the ground side (positive) and Ring is the battery (negative) side of a phone circuit. The ground side is common with the central office of the telephone company (Telco) and the battery side carries −48 volts of DC voltage when in an "idle" or "on hook" state. The combination of tip and ring, then, makes up a normal phone line circuit. To ring the phone to alert to an incoming call, about 90 volts of 20 Hz AC current is superimposed over the DC voltage already present on the idle line.

Figure 2:
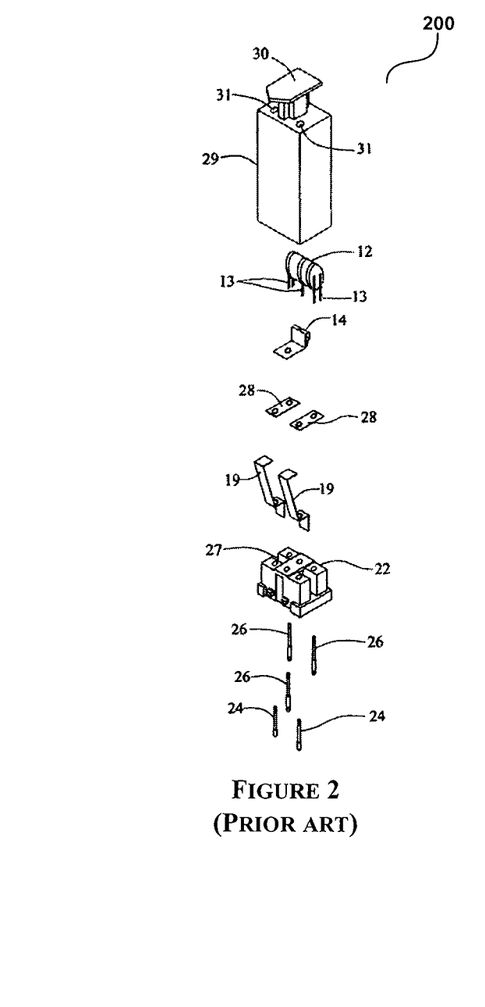
FIG. 2 illustrates an example of an exploded perspective view of the internal components of the surge protection module of FIG. 1.

FIG. 2 illustrates an example of an exploded perspective view of the internal components of a surge protection module 200. In the depicted embodiment, the surge protection module 200 incorporates a gas tube surge protector 12 having electrically conductive leads 13, a fail-safe device 14, spring clips with test point contacts 19, pin block 22, short pins 24 and long pins 26.

A protector housing 29 provides a cover for the internal components of a surge protection module 200. The protector housing 29 includes a handle 30. The handle 30 provides a means for installing and removing the surge protection module 200 from a central office rack mount protector block. In one embodiment, the protector housing 29 made of self-extinguishing thermoplastic that provides a fire barrier. The protector housing 29 may also include apertures 31 to enable contact by test instruments with test point spring clips 19 for performing testing of the equipment.

Pin block 22 has a plurality of bores 27 for receiving the respective narrow necks of the pins. A pair of bridge shunt bars 28 provides electrical communication between short pins 24 and long pins 26. Contacts 13 of gas tube 12 are then brought into electrical engagement with respective tops of preselected pins. In one embodiment, short pins 24 are in electrical communication with customer equipment and long pins 26 are in electrical communication with devices of a service provider. Alternatively, in other embodiments, short pins 24 are in electrical communication with devices of a service provider and long pins 26 are in electrical communication with customer equipment. The fail safe device 14 is designed to short out the circuit to prevent long duration fault currents from reaching customer equipment.

Figure 3:
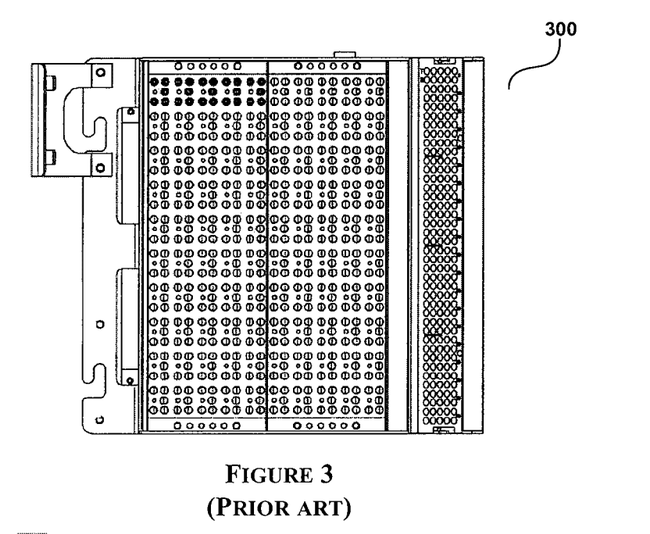
FIG. 3 illustrates an example of a central office rack mount protector block.
Figure 4:
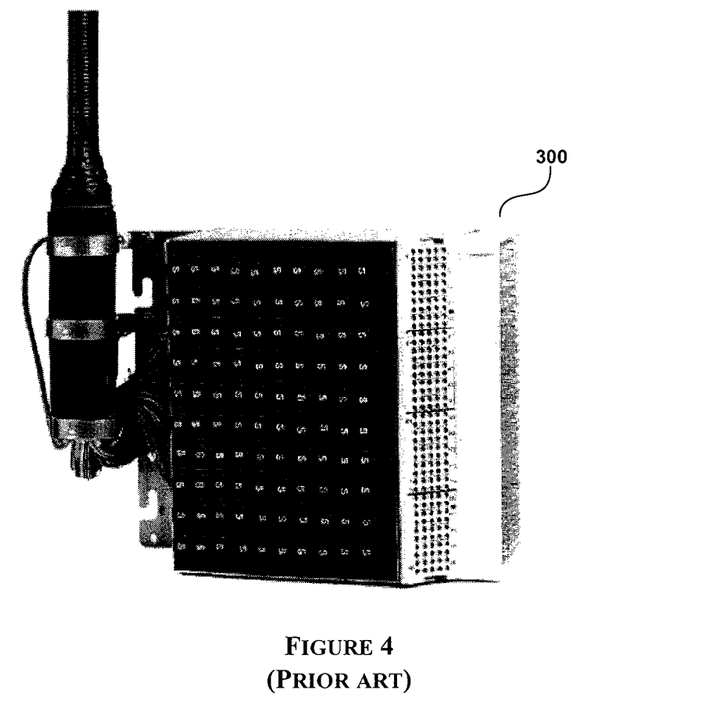
FIG. 4 is a picture illustrating the central office rack mount protector block of FIG. 3 having surge protection modules inserted therein.
Figure 9:
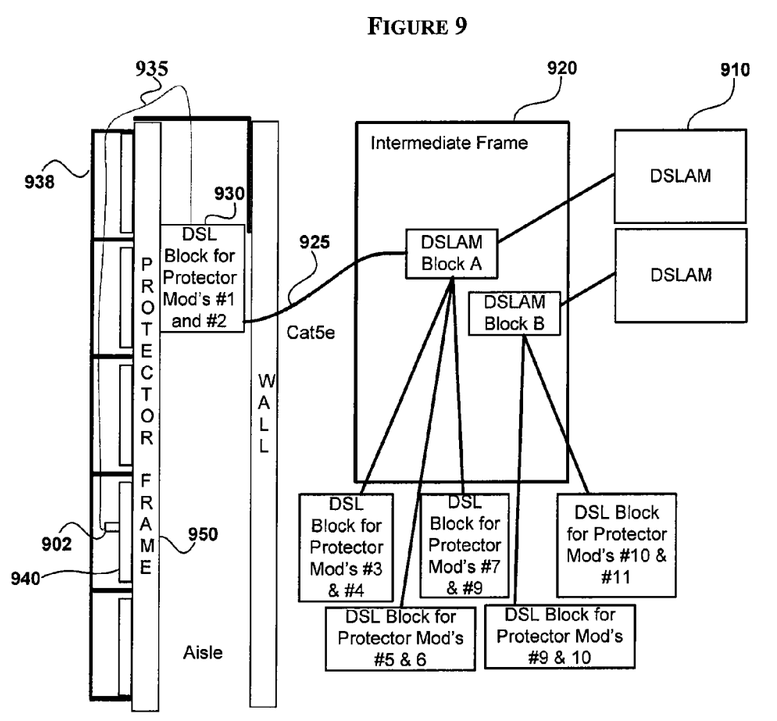
FIG. 9 is a block diagram illustrating an example of the connection between a modified surge protection module and central office equipment in accordance with the disclosed embodiments.

FIG. 3 illustrates an example of a central office rack mount protector block 300. The central office rack mount protector block 300 is designed to accept 100 of the industry standard 5 Pin surge protection modules, as described above, for completing the connection between the CO equipment lines and the outside plant (O.P.) lines. Multiple ones of the central office rack mount 300 are typically mounted to a central office protector frame 950, as illustrated in FIG. 9. A typical central office protector frame may be several feet tall and several feet wide (e.g., 6 ft. tall by 5 ft. wide). FIG. 4 is a picture illustrating the central office rack mount protector block 300 with surge protection modules inserted therein.

Figure 5:
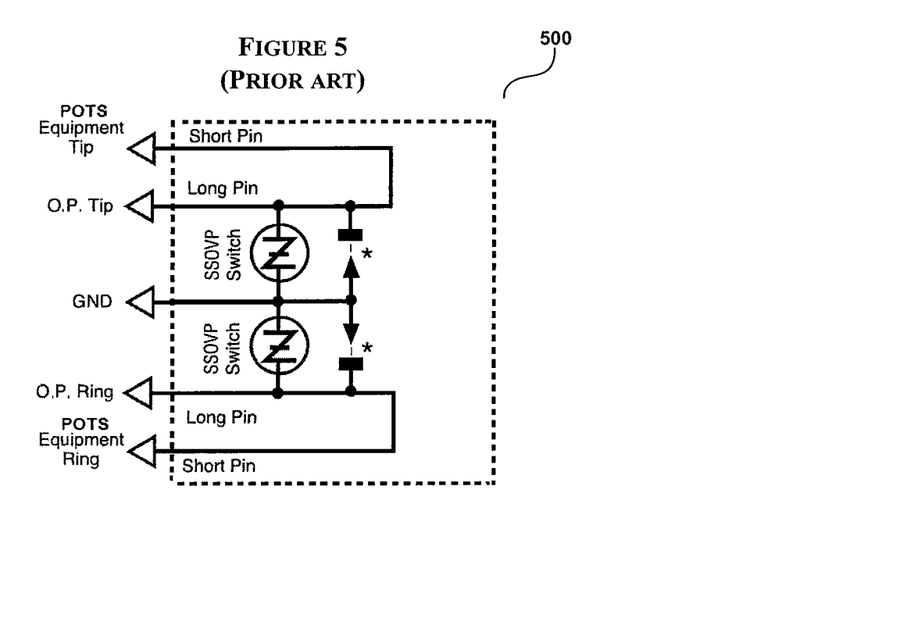
FIG. 5 illustrates an example of a circuit diagram of the typical surge protection module of FIG. 1.

FIG. 5 illustrates an example of a circuit diagram of a solid-state overvoltage protector (SSOVP) module 500 for use in central office connector (e.g., central office rack mount protector block 300), remote and building entrance terminal applications. The solid-state overvoltage protector (SSOVP) module 500 has five contact pins. When inserted into the connector sockets of a central office rack mount protector block, contact pins provide the following connections for each cable pair: protection ground that also acts as a polarization pin, tip and ring to the outside plant cable via the long pins, and tip and ring to the central office equipment via the short pins. When the solid-state overvoltage protector (SSOVP) module 500 is fully inserted into the connector base, the outside plant and the central office pairs are connected together. The 5-pin module is designed to short-to-ground (also known as a "fail-short event") when it encounters lightning, power cross or other electrical conditions that exceed the surge capabilities of the SSOVP device. Similarly, the SSOVP switches may be replaced with gas tubes having a fail-short mechanism that shunts transient voltages to ground for gas tube overvoltage type protector modules.

The inventors recognize that the current design of surge protector modules, while suitable for providing POTS service, are not suitable for providing high speed digital subscriber line (DSL) services outside of large host offices due to the noise received by the serving DSL pair as it traverses the office.

Accordingly, the disclosed embodiments seek to address the problem by allowing for the bypass of untwisted office wiring. For instance, in one embodiment, a surge protection module is modified by dropping the POTS tip and ring inputs. Two POTS/DSL wire wrap inputs are then molded into the face of the protector block. POTS and DSL services are then delivered to the surge protection module via high speed twist wire. The high speed twist wire reduces noise by canceling electromagnetic interference (EMI) from external sources.

Figure 6:
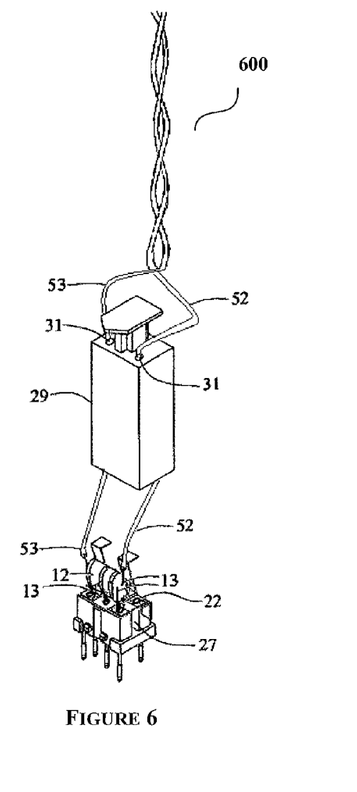
FIG. 6 illustrates an example of a modified surge protection module in accordance with the disclosed embodiments.
Figure 7:
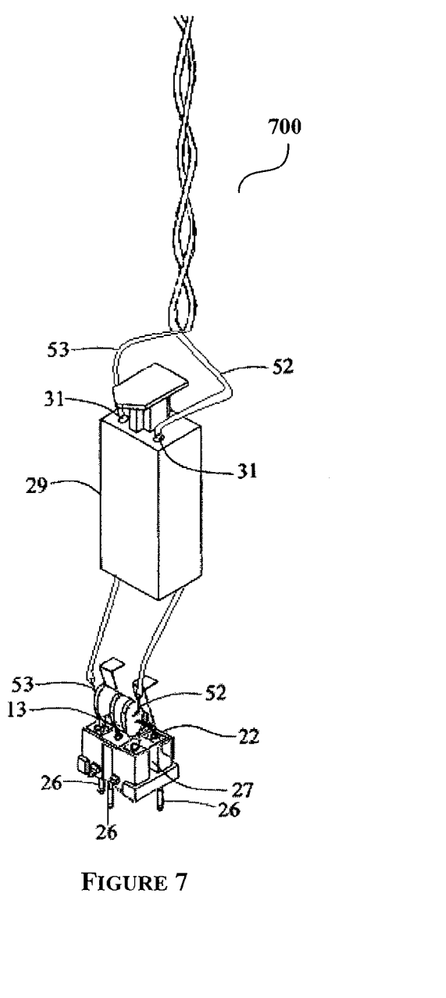
FIG. 7 illustrates another example of a third modified surge protection module in accordance with the disclosed embodiments.

FIG. 6 illustrates an example of a modified surge protection module 600 in accordance with the disclosed embodiments. The modified surge protection module 600 is an example of a modified gas tube protector module, such as that illustrated in FIG. 2. In the modified surge protection module 600, the contacts 13 of the gas tube 12 are disconnected from the respective tops of the two pins that are in electrical communication with the devices of the service provider (i.e., the central office (CO) POTS tip and ring). Instead, a POTS/DSL twisted wire wrap line consisting of a POTS/DSL Tip wire 52 and a POTS/DSL Ring wire 53 is delivered directly into the modified surge protection module 600 via the apertures 31. The POTS/DSL Tip wire 52 and the POTS/DSL Ring wire 53 are connected (e.g., via welding) to the respective disconnected contacts 13 of the gas tube 12. In the depicted embodiment, all five pins on the modified surge protection module 600 are retained for proper orientation/fit into the central office rack mount protector block 300. However, in other embodiments, the respective pins for the POTS tip and ring may be removed as illustrated in FIG. 7.

Figure 6A:
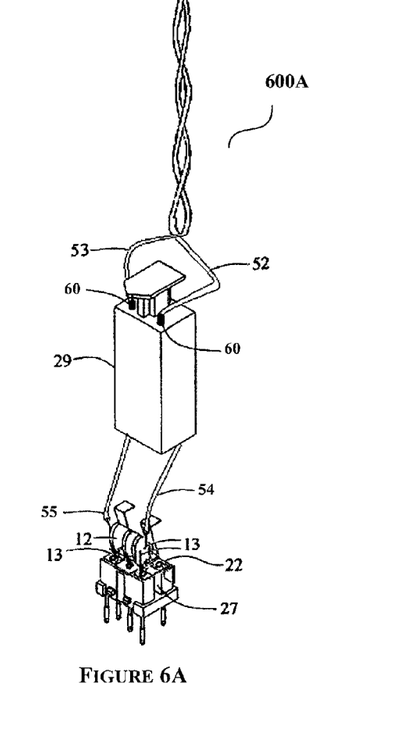
FIG. 6A illustrates an example of a second modified surge protection module in accordance with the disclosed embodiments.
Figure 7A:
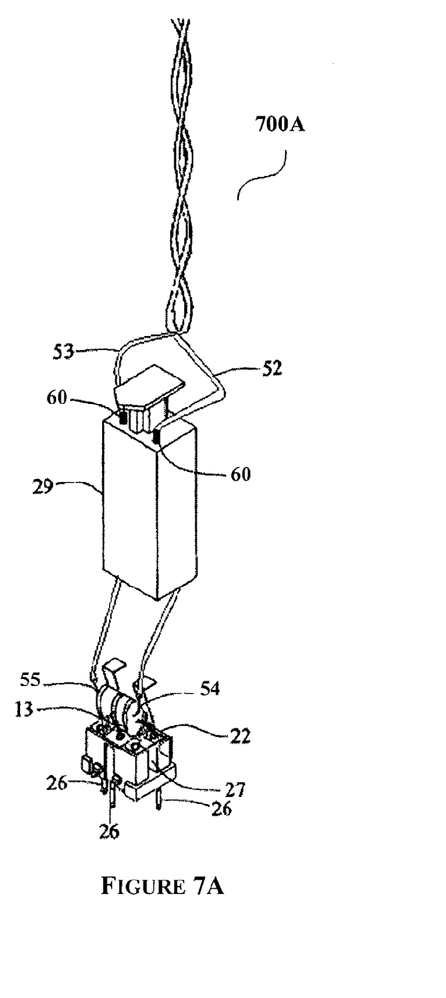
FIG. 7A illustrates another example of a fourth modified surge protection module in accordance with the disclosed embodiments.

FIGS. 6A and 7A respectively illustrate a modified surge protection module 600A and 700A in accordance with the disclosed embodiments. The modified surge protection module 600A and the modified surge protection module 700A are respectively similar to the modified surge protection modules 600 and 700, except the modified surge protection module 600A and the modified surge protection module 700A each include a pair of wire wrap pins 60 on the face of the protector housing 29 for connecting the DSL twisted wire wrap line consisting of a DSL Tip wire 52 and a DSL Ring wire 53 externally to the modified surge protection modules 600A and 700A. The pair of wire wrap pins 60 is connected internally to the contacts 13 of the gas tube 12 via internal connections 54 and 55.

Figure 8:
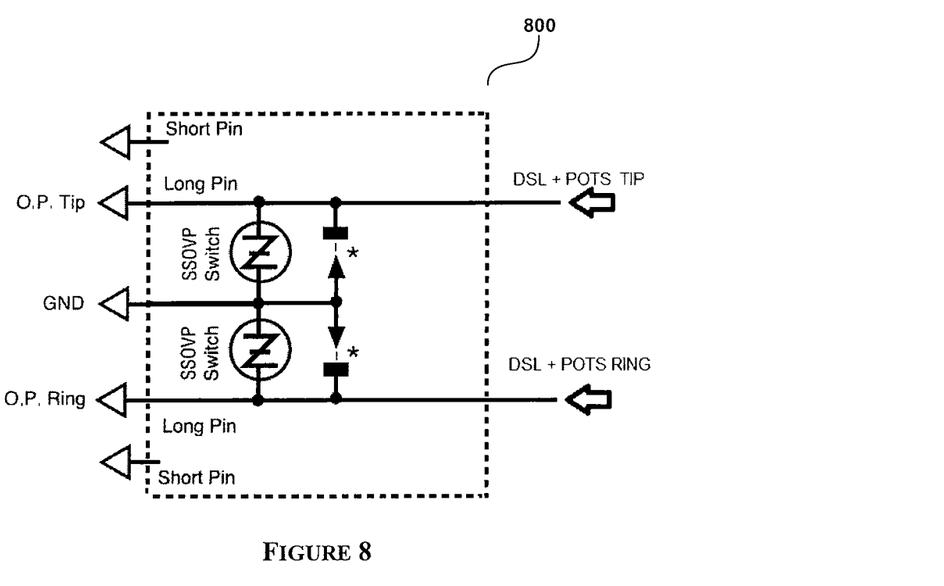
FIG. 8 illustrates an example of a circuit diagram of a modified surge protection module in accordance with the disclosed embodiments.

FIG. 8 illustrates an example of a circuit diagram 800 of a modified surge protection module in accordance with the disclosed embodiments. As illustrated in the circuit diagram 800, the electrical connection to the short pins of the modified surge protection module, which were previously connected to the POTS tip and ring, have been disconnected. In their place is a direct electrical connection to a POTS/DSL Tip wire and a POTS/DSL Ring wire via high speed twist wire.

FIG. 9 is a block diagram illustrating an example of the connection between a modified surge protection module 902 and central office equipment in accordance with the disclosed embodiments. In the depicted embodiment, POTS/DSL is combined at a digital subscriber line access multiplexer (DSLAM) device 910 of a main distribution frame (MDF). The DSLAM handles the high-speed digital data streams coming from numerous subscribers' DSL modems and aggregates it onto a single high-capacity uplink—ATM or Gigabit Ethernet.

The DSLAM 910 may be connected to one or more DSLAMs of an intermediate distribution frame (IDF) 920. The intermediate distribution frame 920 may be a free-standing or wall-mounted rack for managing and interconnecting the telecommunications cable between end user devices and the main distribution frame. From there, a Cat5e, or other suitable cabling 925, is used to connect to a DSL Block 930.

A POTS/DSL twisted pair wire wrap line 935 consisting of a POTS/DSL Tip wire and a POTS/DSL Ring wire is delivered directly into the modified surge protection module 902 via the face of the modified surge protector module 902 as illustrated in FIG. 6. The modified surge protector module 902 is then inserted into a central office rack mount protector block 940 (as illustrated in FIG. 3) for completing the connection between the CO equipment lines and the outside plant (OP) lines. A rigid bracket 938 may be coupled to the central office protector frame 950 for providing a means for supporting and/or organizing a plurality of the twisted pair wire wrap lines.

Accordingly, the above embodiments described a method utilizing a modified surge protection module for providing for high speed digital subscriber line (DSL) services. Advantages of the disclosed embodiments include, but are not limited to, reducing the overall noise that affects the DSL service.

While the above description describes various embodiments, the disclosed description is not intended to limit the structure or implementation of the disclosed embodiments. One of ordinary skill in the art would recognize that various modifications may be made and that the teachings disclosed herein may be implemented in various forms and may be applied to numerous applications. For instance, while the depicted embodiment in FIG. 6 illustrates a modification to a gas tube surge protection module, a similar modification may be made to a solid-state overvoltage protector (SSOVP) module. Likewise, while the depicted embodiment in FIG. 8 illustrates a disconnection/removal of the short pins, a similar modification may be made to disconnect/remove the long pins in surge protector modules in which the long pins are connected to the CO tip and ring.

Accordingly, it is intended by the following claims to claim any and all applications, modifications, and variations of the present teachings that fall within the scope of the appended claims.

We claim:

1. A surge protection module comprising:
   an overvoltage protection component;
   a ground pin configured on a bottom end of the surge protection module, the ground pin in electrical communication with the overvoltage protection component;
   a pair of outside plant tip and ring pins configured on the bottom end of the surge protection module, the pair of outside plant tip and ring pins in electrical communication with the overvoltage protection component; and
   a pair of wire wrap pins on a front face of the surge protection module configured to receive a wire wrap pair comprising a central office tip wire and a central office ring wire, wherein the central office tip wire and the central office ring wire are configured to be in electrical communication with the overvoltage protection component.

2. The surge protection module of claim 1, further comprising a second pair of pins configured on the bottom end of the surge protection module, wherein the second pair of pins are not in electrical communication with the overvoltage protection component.

3. The surge protection module of claim 2, wherein the second pair of pins, the pair of outside plant tip and ring pins, and the ground pin are configured in an industry standard 5 pin configuration for surge protection modules, wherein the 5 pin configuration consists of 3 long pins and 2 short pins.

4. The surge protection module of claim 1, wherein the overvoltage protection component is a gas tube.

5. The surge protection module of claim 1, wherein the overvoltage protection component is a solid-state overvoltage protector (SSOVP).

6. The surge protection module of claim 1, wherein the pair of outside plant tip and ring pins are a pair of long pins.

7. The surge protection module of claim 1, wherein the pair of outside plant tip and ring pins are a pair of short pins.

8. The surge protection module of claim 1, wherein the wire wrap pair consisting of the central office tip wire and the central office ring wire provides both plain old telephone service (POTS) and digital subscriber line (DSL) service.

9. The surge protection module of claim 8, wherein the plain old telephone service and digital subscriber line service are combined at a digital subscriber line access multiplexer (DSLAM) in electrical communication with the surge protection module.

10. A central office comprising:
    a digital subscriber line access multiplexer (DSLAM) configured combined a first signal for plain old telephone service (POTS) and second signal for digital subscriber line (DSL) service to produce a combined POTS/DSL signal;
    a surge protection module having pins located on a bottom face of the surge protection module;
    a twisted pair wire wrap line consisting of a tip wire and a ring wire coupled to the surge protection module via a pair of wire wrap pins on a front face of the surge protection module, the twisted pair wire wrap line delivering the combined POTS/DSL signal to the surge protection module.

11. The central office of claim 10, further comprising:
    a central office rack mount protector block having receptacles for engaging the pins of the surge protection module.

12. The central office of claim 11, further comprising:
    a central office protector frame for housing a plurality the central office rack mount protector blocks.

13. The central office of claim 12, further comprising:
    a rigid bracket coupled to the central office protector frame for supporting a plurality of the twisted pair wire wrap lines.

14. A surge protection module comprising:
    an overvoltage protection component;
    a ground pin configured on a bottom end of the surge protection module, the ground pin in electrical communication with the overvoltage protection component;
    a pair of outside plant tip and ring pins configured on the bottom end of the surge protection module, the pair of outside plant tip and ring pins in electrical communication with the overvoltage protection component; and
    a pair of wire wrap pins on a front face of the surge protection module, the pair of wire wrap pins being configured to receive a wire wrap pair comprising a central office tip wire and a central office ring wire, wherein the central office tip wire and the central office ring wire are configured to be in electrical communication with the overvoltage protection component.

15. The surge protection module of claim 14, further comprising a second pair of pins configured on the bottom end of the surge protection module, wherein the second pair of pins are not in electrical communication with the overvoltage protection component.

16. The surge protection module of claim 15, wherein the second pair of pins, the pair of outside plant tip and ring pins, and the ground pin are configured in an industry standard 5 pin configuration for surge protection modules, wherein the 5 pin configuration consists of 3 long pins and 2 short pins.

17. The surge protection module of claim 14, wherein the overvoltage protection component is a gas tube.

18. The surge protection module of claim 14, wherein the overvoltage protection component is a solid-state overvoltage protector (SSOVP).

19. The surge protection module of claim 14, wherein the pair of outside plant tip and ring pins are a pair of long pins.

20. The surge protection module of claim 14, wherein the pair of outside plant tip and ring pins are a pair of short pins.

* * * * *